United States Patent [19]

Higashi

[11] Patent Number: 5,072,089
[45] Date of Patent: Dec. 10, 1991

[54] WIRE-CUT ELECTRIC DISCHARGE MACHINING METHOD

[75] Inventor: Izumi Higashi, Yamanashi, Japan

[73] Assignee: Fanuc Ltd., Yamanashi, Japan

[21] Appl. No.: 432,772

[22] PCT Filed: Apr. 7, 1989

[86] PCT No.: PCT/JP89/00379

§ 371 Date: Nov. 3, 1989

§ 102(e) Date: Nov. 3, 1989

[87] PCT Pub. No.: WO89/09672

PCT Pub. Date: Oct. 19, 1989

[30] Foreign Application Priority Data

Apr. 14, 1988 [JP] Japan ............................ 63-90177

[51] Int. Cl.$^5$ ........................................... B23H 7/10
[52] U.S. Cl. ........................................... 219/69.12
[58] Field of Search ............... 219/69.12, 69.17, 69.13; 364/474.04, 474.15, 474.16, 474.17

[56] References Cited

U.S. PATENT DOCUMENTS

| 4,559,434 | 12/1985 | Kinoshita | 219/69.12 |
| 4,581,514 | 4/1986 | Inoue | 219/69.12 |
| 4,689,457 | 8/1987 | Izumiya et al. | 219/69.12 |

FOREIGN PATENT DOCUMENTS

| 52-61897 | 5/1977 | Japan | 219/69.12 |
| 224217 | 12/1984 | Japan | 219/69.13 |
| 60-39029 | 2/1985 | Japan . | |
| 197320 | 10/1985 | Japan | 219/69.12 |
| 61-95828 | 5/1986 | Japan . | |
| 61-121827 | 6/1986 | Japan . | |
| 61-297025 | 12/1986 | Japan . | |
| 63-7230 | 1/1988 | Japan . | |

Primary Examiner—Geoffrey S. Evans
Attorney, Agent, or Firm—Staas & Halsey

[57] ABSTRACT

A wire-cut electric discharge machining method which is capable of preventing damage which may be caused when electric discharge machining is interrupted due to a shortage of wire supply in the middle of a certain machining section, so as to improve the quality of products. A central processing unit unit compares a residual wire length with a consumed wire length necessary for machining associated with each block of a machining program, and successively determines whether the machining for each block can be completed. If it is concluded that the machining cannot be completed, a warning message is displayed, and the electric discharge machining is stopped when the machining associated with the block currently in execution is finished. In consequence, the electric discharge maching is interrupted at a bending position of a machining path, so that the machined surface of a workpiece never suffers damage which entails lowering of product quality.

9 Claims, 4 Drawing Sheets

WIRE-CUT ELECTRIC DISCHARGE MACHINING
METHOD

BACKGROUND OF THE INVENTION

1. Field of the Invention

The present invention relates to a wire-cut electric discharge machining method capable of preventing damage which is attributable to a shortage of wire supply in the course of machining, and entails lowering of product quality.

2. Description of the Related Art

Electric discharge machining is effected along various machining paths, whose sections are generally composed of a series of machining sections each in the form of a straight line, circular arc or the like. A wire electrode (hereinafter referred to as wire) sometimes may be used up during such electric discharge machining. In such a case, the electric discharge machining must be interrupted, and the interruption of the machining may cause the machined surface of a workpiece to be damaged. Damage caused when the machining is interrupted in the middle of a certain machining section, in particular, is so conspicuous that it lowers the quality of products. For example, if the wire is used up at an intermediate point Ps of, e.g., a fourth section, during the execution of electric discharge machining along a rectangular machining path composed of first, second, third, fourth, fifth, and sixth linear sections POP1, P1P2, P2P3, P3P4, P4P5, and P5P1 shown in FIG. 5, damage is liable to be caused at the machining interruption position Ps.

In order to eliminate such an awkward situation, a proposal has conventionally been made such that the feasible machining time or machining distance should be periodically obtained and displayed in accordance with the wire remaining on a wire supply reel (see Japanese Provisional Patent Publication No. 61-95828, for example). According to the prior art of this type, however, an operator must replace the wire supply reel at a suitable point of time, while observing the machinable time or machinable distance. If the operator fails to monitor the machinable time or machinable distance, therefore, the wire will be used up in the middle of the machining section, e.g., at the intermediate point Ps of FIG. 5, thus entailing the aforementioned awkward situation.

SUMMARY OF THE INVENTION

An object of the present invention is to provide a wire-cut electric discharge machining method, in which electric discharge machining can be automatically stopped when machining for a machining section in which the machining can be achieved with use of a remaining wire is finished. The present invention prevents damage to the surface of a workpiece, which may be caused when electric discharge machining is interrupted in the middle of a certain machining section, due to a shortage of wire supply. Consequently the quality of products can be improved.

In order to achieve the above object, a wire-cut electric discharge machining method according to the present invention comprises steps of: (a) obtaining a residual wire length at start of machining; (b) reading a numerical control program block by block; (c) obtaining a consumed wire length in machining associated with an unexecuted block in accordance with command information associated with the block read in the step (b); (d) determining whether a necessary wire length for the machining associated with the unexecuted block remains, in accordance with the residual wire length at the start of the machining and the consumed wire length; (e) automatically stopping the machining when the machining associated with a block preceding the unexecuted block ends if it is concluded that the necessary wire length does not remain.

According to the present invention, as described above, the machining is automatically stopped when the machining associated with a block preceding the unexecuted block ends if it is concluded that the necessary wire length for the machining associated with the unexecuted block does not remain. Accordingly, a shortage of wire supply in the middle of a certain machining section of a machining path and damage accompanying the same can be securely prevented, so that product quality can be improved.

DESCRIPTION OF THE PREFERRED EMBODIMENTS

Figure 1:
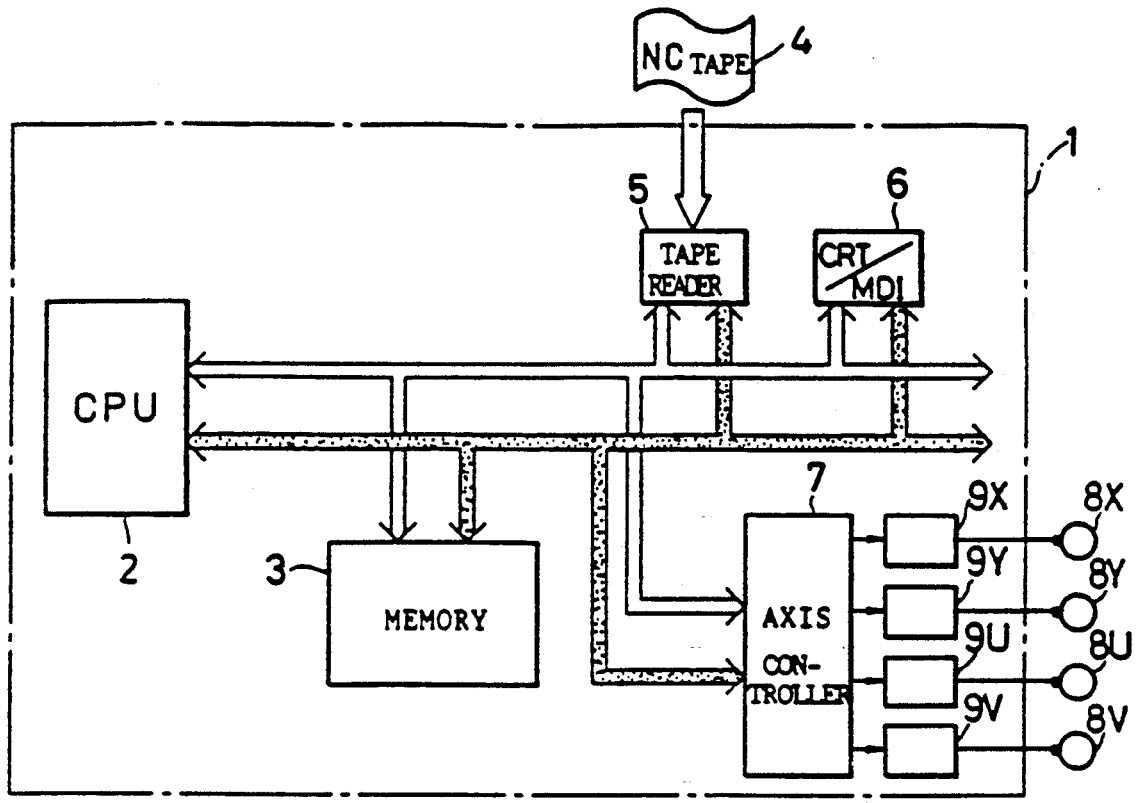
FIG. 1 is a block diagram illustrating the principal part of a wire-cut electric discharge machine for embodying a method according to the present invention.
Figure 5:
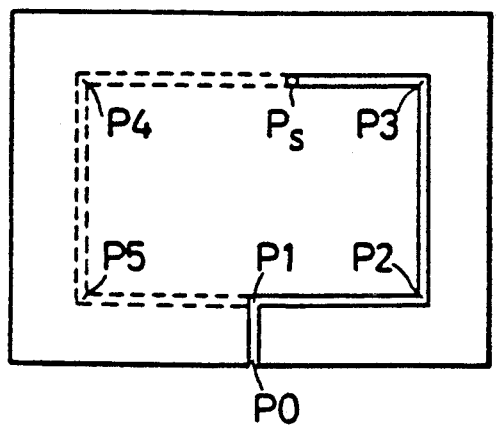
FIG. 5 is a diagram exemplarily illustrating a machining path for electric discharge machining.

In FIG. 1, a numerical control unit 1 of a wire-cut electric discharge machine comprises a central processing unit (hereinafter referred to as CPU) 2, to which connected through busses are a memory 3 including a ROM stored with a program for controlling the operations of various operating parts of the electric discharge machine, RAM for temporary storage and the like; a tape reader 5 for reading a machining program on an NC tape 4; a manual data input device with CRT display unit (hereinafter referred to as CRT/MDI) 6; and an axis controller 7. The CRT/MDI 6 is used for manual entry of the machining program, setting and changing of wire feed speed, display of warning messages, etc. The axis controller 7 is connected with servo circuits for driving servomotors for various axes. Further, the electric discharge machine, which comprises a horizontally movable table for carrying a workpiece and an upper guide disposed above the table for horizontal movement, is arranged to drive the table in the directions of X- and Y-axes by means of servomotors 8X and 8Y which are connected to servo circuits 9X and 9Y, respectively, and drive the upper guide in the directions of U- and V-axes by means of servomotors 8U and 8V which are connected to servo circuits 9U and 9V, respectively.

Furthermore, the machine is so arranged that the wire feed speed and wire length entered through the CRT/MDI 6, as well as the machining program entered through the tape reader 5 or the CRT/MDI 6, are stored in a nonvolatile user storage region of the memory 3.

The CPU 2 is arranged to read out the machining program block by block through the tape reader 5 when the NC tape is used, or from the memory 3 when the machining program is registered on the memory 3, and convert NC command data described in each block into data in an executable form (machine language data) which is easy to process in the numerical control unit 1, and cause the axis controller 7 to drive the servomotors for the individual axes in accordance with the executable data, whereby the various operating parts of the electric discharge machine, including the table and the upper guide, are driven to effect electric discharge machining.

Moreover, the electric discharge machine, which has a conventional override function, is arranged to permit an operator to change a program-assigned parameter, e.g., command machining speed, during the machining by operating an override switch (not shown).

Figure 2:
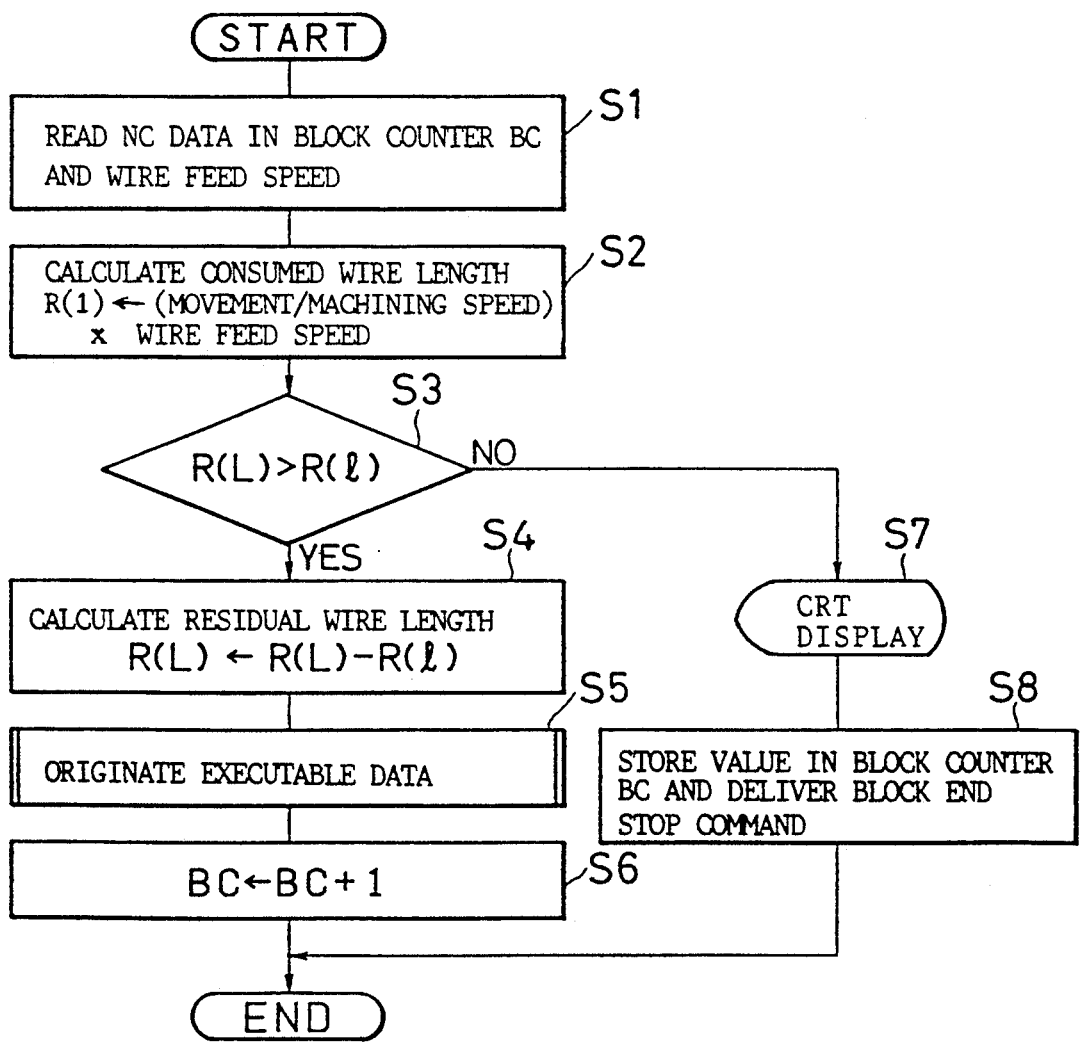
FIG. 2 is a flow chart showing an electric discharge machining method according to a first embodiment of the present invention.

Referring now to FIG. 2, a wire-cut electric discharge machining method according to a first embodiment of the present invention will be described.

This embodiment is characterized in that the machining is automatically stopped when a machining process for a block directly preceding a detected block, if any, in which a virgin wire portion terminates in the course of the machining, ends.

First, in attaching a wire supply reel wound with a wire to the electric discharge machine, the operator enters parameters related to the overall length (residual wire length) L of the wire portion remaining on the reel, by means of a keyboard of the CRT/MDI 6. These parameters include the specific gravity $\rho$ of the wire, wire diameter D, total weight w1 of the wire supply reel and the wire wound thereon, and weight w2 of the reel only. In response to the keyboard operation, the CPU 2 automatically calculates and sets the residual wire length L.

At the start of the machining, the CPU 2 periodically executes, as task processing, pulse distribution and executable data origination as preprocessing. In the data origination process, the CPU 2 identifies the current residual wire length. More specifically, the CPU 2 first reads that block of the machining program which corresponds to the value (initial value is 0) in a block counter BC, through the tape reader 5 or from the memory 3, reads the NC command data described in the read block, and reads a command wire feed speed from the memory 3 (Step S1). Then, the CPU 2 calculates the necessary wire length (consumed wire length) for the machining for the block concerned in accordance with the NC command data (including command moving distance and command machining speed) and the command wire feed speed, causes a register R (L) at the nonvolatile storage region of the memory 3 to store the wire length, and causes the storage region to store the command wire feed speed (Step S2).

Subsequently, the CPU 2 compares the residual wire length L set in the register R (L) with the consumed wire length 1 stored in the register R (1), and determines by the residual wire whether the machining for the block read in Step S1 can be completed (Step S3). If it is concluded that the residual wire length L is longer than the consumed wire length 1 for the block concerned so that the machining for this block can be completed, the consumed wire length 1 for the block concerned is subtracted from the current residual wire length L, thereby calculating the residual wire length at the end of the machining associated with the block concerned, and the calculated length is set in the register R (L) (Step S4). Then, the executable data is originated in accordance with the command moving distance and the command machining speed read in Step S1 (Step S5), and "1" is added to the value in the block counter BC, so as to update the counter value (Step S6), whereby the executable data origination is finished. Since the command machining speed and the command wire feed speed are read in Step S1, the consumed wire length for each block can always be accurately calculated even when these parameter values are changed in the course of machining through the operator's conventional override operation or keyboard operation, for example. Thus, the reliability of the decision on the machinability in Step S3 is high.

Then, the program proceeds to a pulse distribution process (not shown), whereupon pulses are distributed to the servo circuits for the individual axes in accordance with the executable data, and the machining for the aforesaid block is executed.

Thereafter, the CPU 2 executes the processes of Steps S1 to S6 every time it reads one block of the machining program. If it is concluded in Step S3 that the current residual wire length (residual wire length at the end of the machining for the block currently in execution) L is shorter than the consumed wire length 1 for the block read this time and expected to be executed next so that the machining for the block concerned cannot be executed, the CPU 2 causes the CRT display unit to display a warning message, such as "REPLACE WIRE," which requests replacement of the wire supply reel (Steps S7), and stores the current value in the block counter BC. When the machining associated with the block currently in execution ends, a block end stop command for stopping the electric discharge machining is delivered (Step S8). In this case, executable data origination for the next block is not executed. Accordingly, the execution of the machining program, and hence, the electric discharge machining, are stopped immediately when pulse distribution for the block currently in execution ends. In other words, the execution of the machining associated with the block read this time is prevented. In case of a shortage of the wire supply, therefore, the electric discharge machining can be interrupted securely at the boundary between two adjacent machining sections of a machining path, or in general, at a position on the machining path where the machining path bends, and the machining cannot be interrupted in the middle of a certain machining section. Even if the machining is interrupted due to a shortage of the wire supply, therefore, the machined surface of the workpiece never suffers damage which entails lowering of product quality.

In case of the automatic interruption described above, the operator can recognize, according to the warning message, that the interruption of the machining is attributable to the shortage of the wire supply. In this case, the operator operates the keyboard to deliver a machining start point return command. In response to this, the CPU 2 restores the table, stopped at a machining interruption position, to a machining start point. Then, the operator replaces the wire supply reel with a new one. When the conventional automatic connecting operation by means of the electric discharge machine is finished, moreover, the operator operates the keyboard to store the register R (L) with a new residual wire length and clear the register R (1). After restoring the table to the machining interruption position along the machining path in a non-machining operation mode, the CPU 2 restarts the execution of the machining program from the block corresponding to the value in the block counter BC stored in Step S8.

The following is a description of an electric discharge machining method according to a second embodiment of the present invention. This embodiment is characterized in that, before the start of the machining, determination of the presence of a block (hereinafter referred to as unmachinable block) in which the wire terminates in the course of the machining and identification of this block are effected beforehand, and that, after the start of the machining, the machining is executed until the block directly preceding the unmachinable block, and the detection of the unmachinable block is executed again when the wire feed speed is changed in the course of the machining.

Figure 3:
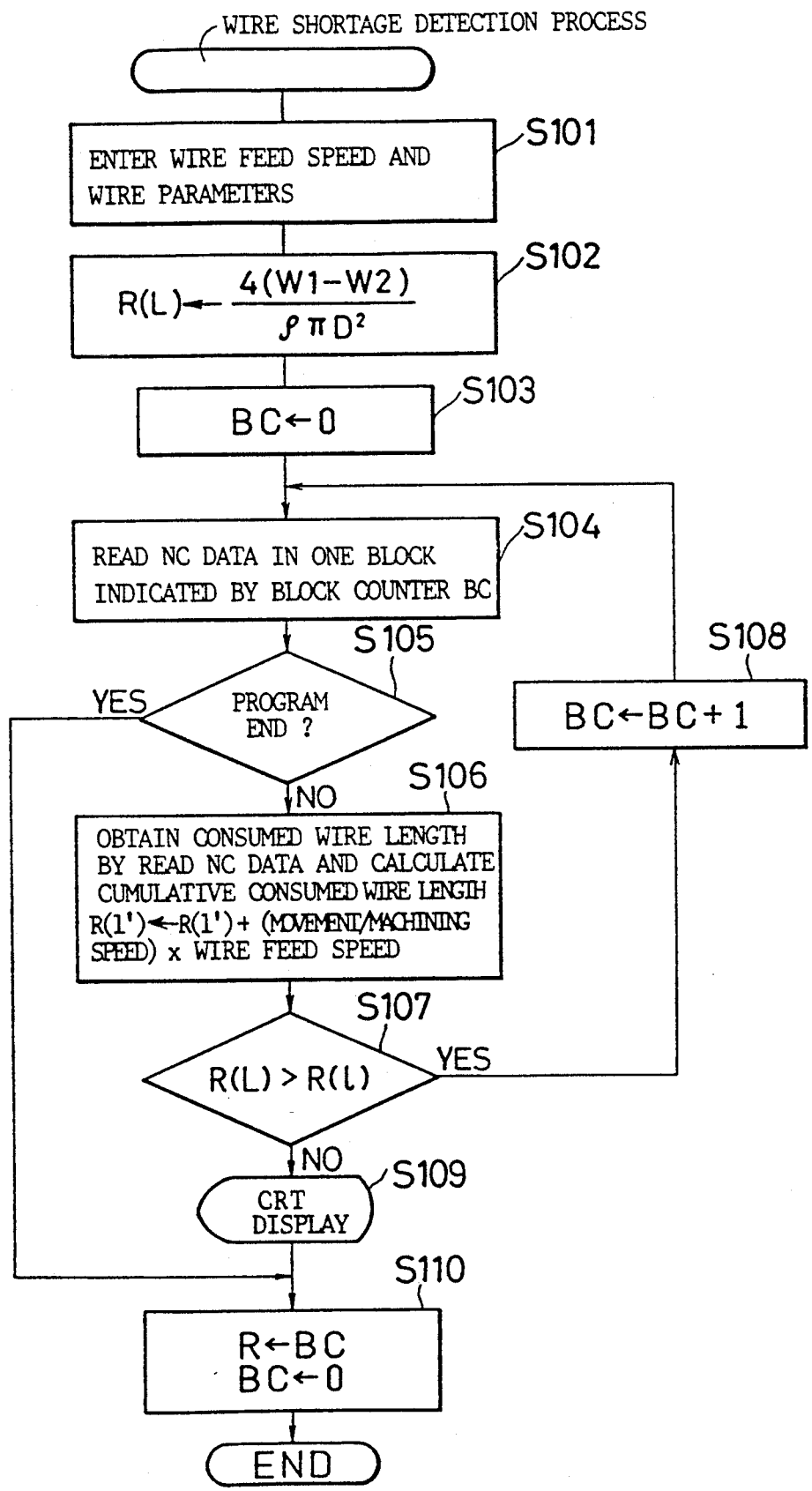
FIG. 3 is a flow chart showing a wire shortage detection process of an electric discharge machining method according to a second embodiment of the present invention.

Referring now to FIG. 3, an unmachinable block detection process will be described.

In setting the wire supply reel in the electric discharge machine, the operator enters the parameters $\rho$, D, w1 and w2 related to the wire feed speed and the residual wire length, and then enters a wire shortage detection command by means of the keyboard, as in the case of the first embodiment. In response to this command, the CPU 2 reads the aforesaid four parameters (Step S101), calculates the residual wire length L in accordance with these parameters, sets the calculated value in the register R (L) of the memory 3, and causes this memory to store the command wire feed speed (Step S102).

Subsequently, the CPU 2 sets "0" in the block counter BC (Step S103), and reads the NC command data in the block corresponding to the value in the block counter BC (Step S104). Then, the CPU 2 determines whether the read data is a command for the end of the machining program (Step S105). If the data does not indicate the end of the program, the CPU 2 calculates the consumed wire length for the block concerned, as in the case of the first embodiment, and adds the calculated value to the value in a register R (1'), which is stored with an estimated cumulative consumed wire length (initial value is "0") up to the block directly preceding the block concerned, thereby updating the value in the register R (1') (Step S106).

Subsequently, the CPU 2 compares the residual wire length L at the start of the machining, stored in the register R (L), and the estimated cumulative consumed wire length 1' stored in the register R (1'), and determines whether the machining for the aforesaid block can be completed with use of the remaining wire (Step S107). If it is concluded that the wire length L is longer than the wire length 1' so that the machining can be completed, the value in the block counter BC is updated (Step S108), whereupon the program proceeds to Step S104.

In this manner, a loop defined by Steps S104 to S108 is repeated. If it is concluded in Step S107, in the meantime, that the estimated cumulative consumed wire length 1' is longer than the residual wire length L at the start of the machining so that the machining associated with the block read in the loop concerned cannot be completed, the CPU 2 displays beforehand a warning message, such as "WIRE WILL BE IN SHORT SUPPLY DURING EXECUTION OF MACHINING PROGRAM" (Step S109). After causing the register R to store the current value in the block counter BC, indicative of the unmachinable block, the CPU 2 sets the value in the block counter BC again to "0" to start the machining (Step S110). In Step S109, the block counter value indicative of the unmachinable block may be displayed together with the warning message. Referring to this display, the operator determines whether the unmachinable block is associated with machining (e.g., splining) such that its careless interruption causes trouble even if the interruption will occur at the end of the block. If necessary, the wire supply reel is replaced with a new one in this stage.

During the execution of the aforesaid loop, if the NC determines at Step S105 that command data read in the loop concerned gives a command for the end of the machining program, that is, if the wire shortage will not be entailed before the end of the machining, the CPU 2 causes the register R to store the current value in the block counter BC which is indicative of the block for the end of the program (Step S110).

Figure 4:
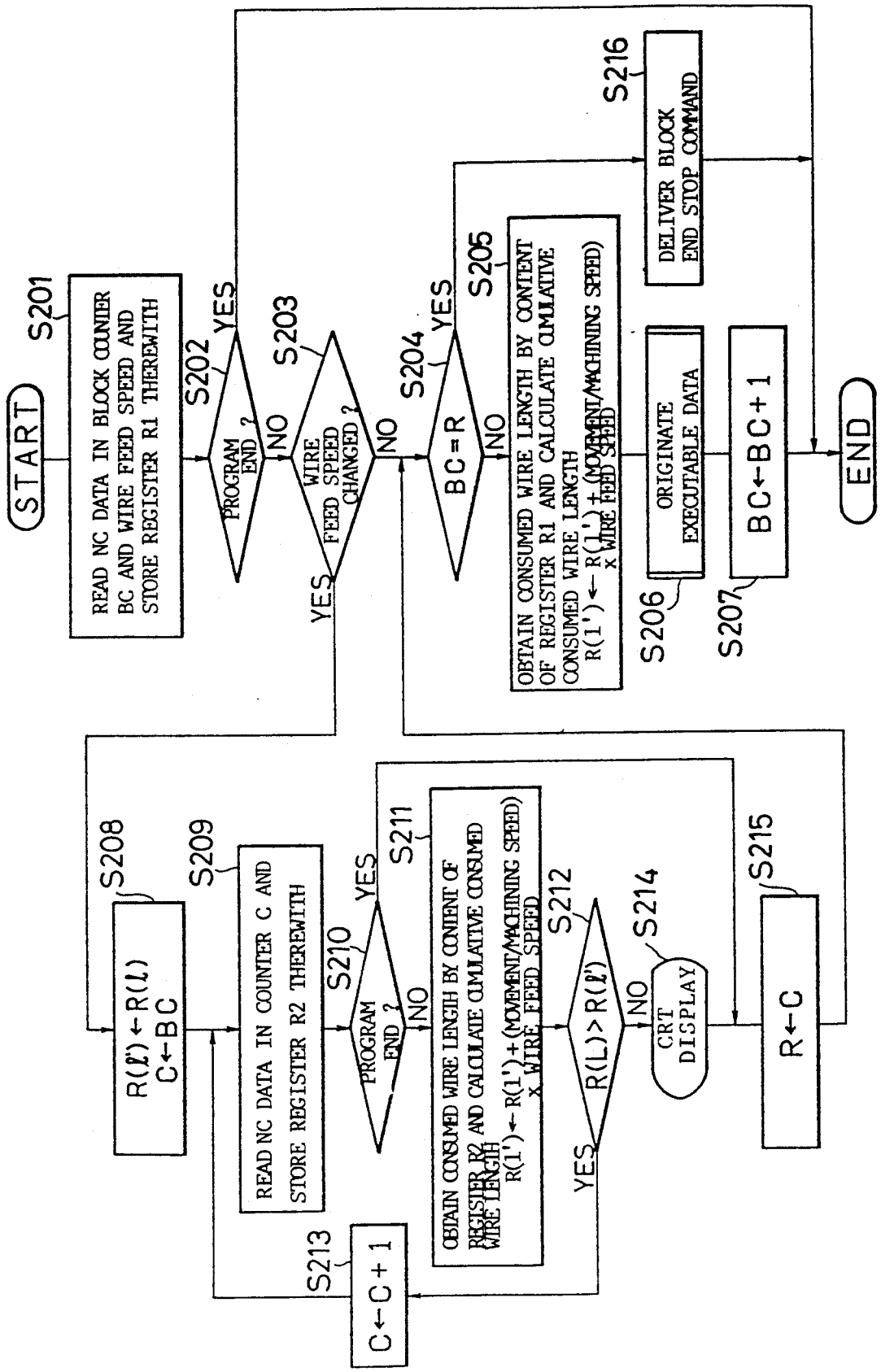
FIG. 4 is a flow chart showing an executable data origination process.

Referring now to FIG. 4, processing operations after the start of the machining will be described.

First, in Step S201 corresponding to Step S1 of FIG. 1, the CPU 2 reads an NC command data in the block of the machining program corresponding to the value in the block counter BC and a command wire feed speed, and causes a register R1 to store these data. Then, the CPU 2 determines whether this NC command data is indicative of the end of the machining program (Step S202). If the data is not indicative of the end of the program, the CPU 2 determines whether the wire feed speed is changed (Step S203). If no change is detected, the CPU 2 determines whether the value in the register R, indicative of the unmachinable block, is attained by the value in the block counter BC (Step S204). If it is concluded that the value indicative of the unmachinable block is not attained so that machining associated with the block read in Step S201 can be completed, the CPU 2 calculates the consumed wire length for the block concerned in accordance with the command moving distance, command machining speed, and command wire feed speed, and adds the calculated value to the value in the register R (1) stored with an actual cumulative consumed wire length, thereby updating the actual cumulative value (Step S205). After originating an executable data in the same manner as in the first embodiment (Step S206), the CPU 2 updates the value in the block counter BC (Step S207). Thereafter, the CPU 2 repeatedly executes the processes of Steps S201 to S207 every time it reads one block.

If the wire feed speed is increased in the course of the machining, the wire may possibly be in short supply during the execution of any block preceding the unmachinable block once determined before the start of the machining. If a change of the wire feed speed is detected in Step S203, therefore, the unmachinable block is detected again in accordance with the changed wire feed speed (Steps S208 to S215).

In this case, the value in register R (1), indicative of the actual cumulative consumed wire length, is first set in the register R (1'), to be used for the discrimination of the unmachinable block, and the current value in the block counter BC is set in a counter C (Step S208). Then, the NC command data in the block corresponding to the value in the counter C is read and stored in a register R2 (Step S209), independently from the machining operation which is being carried out at the present time. Then, a determination as to whether this data is indicative of the end of the program is made (Step S210). If the data is not indicative of the program end, the consumed wire length for the block concerned is calculated, and the calculated value is added to the value in the register R (l') to set the estimated cumulative consumed wire length l' for the case in which machining associated with the aforesaid block will be executed, in Step S211 corresponding to Step S106 of FIG. 3.

Subsequently, in Step S212 corresponding to Step S107 of FIG. 3, whether the machining associated with the aforesaid block can be completed with use of the remaining wire is determined. If it is concluded that the block can be completed, the value in the counter C is updated (Step S213), whereupon the program proceeds to Step S209.

In this manner, a loop including Steps S209 to S212 is repeated. If it is concluded in Step S212, in the meantime, that the machining associated with the block read in the loop concerned cannot be completed, the program proceeds to Step S214 corresponding to Step S109 of FIG. 3, so that a warning message and the unmachinable block are displayed. Then, the current value in the counter C, indicative of the unmachinable block for the case in which the machining is continued at the changed wire feed speed, is set in a register R (Step S215).

If it is concluded in Step S210, during the execution of the aforesaid loop, that the NC command data read in the loop concerned is indicative of the end of the program, the program proceeds to Step S215 corresponding to Step S110 of FIG. 3, whereupon the current value in the counter C, indicative of the block for the end of the program, is stored in the register R.

The electric discharge machining operation will now be described again. If it is found in Step S204 that the value in the block counter BC is equal to the value in the register R, indicative of the unmachinable block, so that the wire will be in short supply when the machining is continued, the program proceeds to Step S216 without originating any executable data, whereupon the block end stop command is delivered in the same manner as in the case of the first embodiment. As a result, the machining is interrupted at the same position on the machining path as in the first embodiment, so that no damage can be caused which entails lowering of product quality. After the interruption of the machining, replacement of the wire supply reel and the like are performed in the same manner as in the first embodiment.

Although the possibility of execution of each block, in the first embodiment described above, is determined in accordance with the result of comparison between the residual wire length at the end of the block directly preceding the block concerned and the consumed wire length for the block, the present invention is not limited to this. As in the second embodiment, for example, the possibility of execution may alternatively be determined in accordance with the result of comparison between the residual wire length at the start of the machining and the cumulative consumed wire length obtained by successively adding the consumed wire lengths for the individual blocks.

Referring to FIG. 2, moreover, Step S4 may be executed immediately after Step S2 so that whether the value in the register R (L) is positive is determined afterward in Step S3. If the value is positive, in this case, the unmachinable block is originated in Step S5.

Also in the second embodiment described above, it is not essential to effect the decision on the machinability on the basis of the result of comparison between the cumulative consumed wire length and the residual wire length at the start of the machining. As in the first embodiment, for example, the machinability may be determined in accordance with the result of comparison between the current residual wire length, obtained by successively subtracting the consumed wire lengths for the individual blocks from the residual wire length at the start of the machining, and the consumed wire length for the next block. If the wire feed speed is changed, in this case, the unmachinable block is detected by successively subtracting the estimated consumed wire lengths for the individual blocks from the value in the register stored with the current residual wire length, in Steps S209 to S215.

I claim:

1. A wire-cut electric discharge machining method, comprising steps of:
    (a) obtaining a residual wire length at start of machining;
    (b) reading a numerical control program block by block;
    (c) obtaining a consumed wire length in machining associated with an unexecuted block in accordance with command information associated with the block read in said step (b);
    (d) determining whether a necessary wire length for the machining associated with said unexecuted block remains, in accordance with said residual wire length at the start of the machining and said consumed wire length; and
    (e) automatically stopping the machining when the machining associated with a block preceding said unexecuted block ends if it is concluded that said necessary wire length does not remain.

2. A wire-cut electric discharge machining method according to claim 1, wherein an overall length of a wire wound on a wire supply reel is obtained when said wire supply reel is mounted on a wire-cut electric discharge machine.

3. A wire-cut electric discharge machining method according to claim 1, wherein said command information includes a command moving distance and a command machining speed, described in the block read in said step (b), and a command wire feed speed given separately from said command moving distance and said command machining speed.

4. A wire-cut electric discharge machining method according to claim 1, wherein the decision in said step (d) is executed in accordance with a cumulative consumed wire length corresponding to the blocks from the first block at the start of the machining to the block directly preceding said unexecuted block.

5. A wire-cut electric discharge machining method according to claim 1, wherein said block preceding said unexecuted block in said step (e) is a block directly preceding said unexecuted block.

6. A wire-cut electric discharge machining method according to claim 1, wherein a warning message is displayed in said step (e).

7. A wire-cut electric discharge machining method according to claim 1, wherein a process for converting the command information described in the block read in said step (b) into executable data and a process of pulse distribution based on the executable data obtained by said conversion are executed, and the execution of said conversion process for the block concerned is prevented if it is concluded in said step (d) that said necessary wire length does not remain.

8. A wire-cut electric discharge machining method according to claim 1, wherein said steps (b), (c) and (d) are executed before the start of the machining, the block concerned is detected as an unmachinable block if it is concluded in said step (d) that said necessary wire length does not remain, whether the block read in said step (b) is said unmachinable block is determined at the time of machining, and the machining is automatically stopped when the machining associated with a block preceding said unmachinable block ends.

9. A wire-cut electric discharge machining method according to claim 8, wherein whether a command wire feed speed is changed during the machining is determined, and if said command wire feed speed is changed, the individual blocks succeeding the block associated with the machining being currently executed are read independently of the machining operation, a consumed wire length corresponding to the changed command wire feed speed is calculated for each block, and said unmachinable block detection is executed again in accordance with the result of said calculation.

* * * * *